US011010498B1

(12) United States Patent
Puvvula et al.

(10) Patent No.: US 11,010,498 B1
(45) Date of Patent: May 18, 2021

(54) APP USAGE DETECTION BASED ON SCREEN LOCK STATE

(71) Applicant: Life360, Inc., San Francisco, CA (US)

(72) Inventors: Naveen Puvvula, Fremont, CA (US); Nitin Bhandari, Pleasanton, CA (US); Sean Miceli, Peoria, AZ (US)

(73) Assignee: Life360, Inc., San Francisco, CA (US)

( * ) Notice: Subject to any disclaimer, the term of this patent is extended or adjusted under 35 U.S.C. 154(b) by 276 days.

(21) Appl. No.: 16/269,425

(22) Filed: Feb. 6, 2019

Related U.S. Application Data

(60) Provisional application No. 62/627,011, filed on Feb. 6, 2018.

(51) Int. Cl.
| | |
|---|---|
| *G06F 21/84* | (2013.01) |
| *H04L 12/26* | (2006.01) |
| *H04L 29/08* | (2006.01) |
| *H04W 28/00* | (2009.01) |
| *H04W 28/02* | (2009.01) |
| *H04W 24/08* | (2009.01) |
| *H04M 15/00* | (2006.01) |

(52) U.S. Cl.
CPC .............. *G06F 21/84* (2013.01); *H04L 43/04* (2013.01); *H04L 43/08* (2013.01); *H04L 43/0805* (2013.01); *H04L 43/0876* (2013.01); *H04L 43/16* (2013.01); *H04L 67/22* (2013.01); *H04W 24/08* (2013.01); *H04W 28/00* (2013.01); *H04W 28/0284* (2013.01); *G06F 2221/2149* (2013.01); *H04M 15/58* (2013.01)

(58) Field of Classification Search
CPC . G06F 21/84; G06F 2221/2149; H04L 43/04; H04L 43/08; H04L 43/16; H04L 43/0805; H04L 67/22; H04W 24/00; H04W 24/08; H04W 24/0284; H04M 15/58
See application file for complete search history.

(56) References Cited

U.S. PATENT DOCUMENTS

| | | | |
|---|---|---|---|
| 8,015,249 | B2 | 9/2011 | Nayak et al. |
| 8,484,568 | B2 | 7/2013 | Rados et al. |
| 8,713,535 | B2 | 4/2014 | Malhotra et al. |
| 9,137,701 | B2 | 9/2015 | Raleigh et al. |
| 9,560,405 | B2 | 1/2017 | McClure et al. |
| 10,021,169 | B2 | 7/2018 | Hendrick et al. |
| 10,171,305 | B2 | 1/2019 | Corson |
| 10,348,653 | B2 * | 7/2019 | Pihlajamaki .......... H04L 51/043 |
| 10,771,619 | B1 * | 9/2020 | Puvvula ............ H04M 1/72569 |
| 2014/0089857 | A1 * | 3/2014 | Wang .................. G06F 3/04817 715/835 |
| 2015/0127819 | A1 | 5/2015 | Cimino et al. |
| 2015/0334219 | A1 * | 11/2015 | Soundararajan ........ H04M 1/67 455/414.1 |
| 2015/0382057 | A1 * | 12/2015 | Huang ............. H04N 21/44204 725/14 |

(Continued)

*Primary Examiner* — Azizul Choudhury
(74) *Attorney, Agent, or Firm* — Womble Bond Dickinson (US) LLP

(57) ABSTRACT

The systems and methods for software application usage detection on a mobile device are disclosed. The software application usage detection is done by monitoring the network usage of the application. The software application usage information is further refined by monitoring the screen lock state of the mobile device. The screen lock information is used to refine the background and foreground usage of the software application.

18 Claims, 13 Drawing Sheets

(56) References Cited

U.S. PATENT DOCUMENTS

2016/0232515 A1\* 8/2016 Jhas ................... G06Q 20/3224
2017/0346713 A1 11/2017 Cimino et al.
2018/0054493 A1 2/2018 Heilpern et al.

\* cited by examiner

```
400

// create the protection file if not already
func initProtection() {
//NP: setup the protection file if not already set
    if !FileManager.default.fileExists(atPath: protectionFilePath) {
        let ok = FileManager.default.createFile(atPath: protectionFilePath,
        contents: nil, attributes: [FileAttributeKey.protectionKey.rawValue:
        FileProtectionType.complete])
    }
}

// Get the current state of the Protection
func protectionState() -> Int {
    var hintLock: Int = 0 // 0 is unknown
    // Create a FileHandle instance
    if FileManager.default.isReadableFile(atPath: protectionFilePath) {
        // Create a FileHandle instance
        if let file = FileHandle(forReadingAtPath: protectionFilePath) {
            // protection-status ?
            hintLock = 1 // 1 is unprotected
        } else {
            // protection-status
            hintLock = 2 // 2 is protected
        }
    }
    return hintLock;
}
```

Figure 4

```
{
"version":"11.2.1",
"device_id":"472AE23B-C658-468B-9A2D-E3746FE2A859",
"consumption":[
 {
 "hint_lck":1,
 "meta_data":[
  {
  "host":"stats.pandora.com",
  "activity_count":3,
  "ua":"Pandora/2021 CFNetwork/893.14.2 Darwin/17.3.0",
  "port":80,
  "type":"HTTP",
  "out":1445,
  "timestamp":1516665571693,
  "in":247
  },
```

510

```
  {
  "host":"adserver.pandora.com",
  "activity_count":2,
  "ua":"Pandora/2021 CFNetwork/893.14.2 Darwin/17.3.0",
  "port":80,
  "type":"HTTP",
  "out":422,
  "timestamp":1516665585148,
  "in":641
  },
  ...
 ],
 "start_epoch_utc":1516665570,
 "seq_id":1516665570161042,
 "user_id":"942aad97-bcdb-42ca-bb3a-26a16f329bcd",
 "seconds_consumed":30,
 "uid":0,
 "time_zone":"America/New_York"
 },
 "skipid":true
}
```

```
{
"version":"11.2.2",
"device_id":"8888BFF0-8BEF-4C53-B77A-8C49A1079193",

"consumption":[
{
"hint_lck":2,
"meta_data":[
{
"activity_count":16,
"host":"app.smartmailcloud.com",
"port":443,
"type":"HTTPS",
"out":1256,
"timestamp":1516666283347,
"in":5176
},
```
— 550

```
{
"activity_count":174,
"host":"sync6.omnigroup.com",
"port":443,
"type":"HTTPS",
"out":47854,
"timestamp":1516666282538,
"in":118810
},
{
"in":59,
"activity_count":1,
"port":443,
"type":"HTTPS",
"timestamp":1516666306885,
"host":"amber-fire-8954.firebaseio.com"
}
],
"start_epoch_utc":1516666282,
"seq_id":1516666282253821,
"user_id":"ba53e7bb-3fdb-4a8e-948e-f757b0e53ecf",
"seconds_consumed":30,
"uid":0,
"time_zone":"America/New_York"
},
"skipid":true
}
```
— 560

Figure 5B

```
{
  "device_id": "5C858A56-D228-4267-98F3-EF3E50223C41",
  "start_epoch_utc": "1517885267",
  "last_start_epoch_utc": "1517886923",
  "consumption": [
    {
      "seconds_consumed": "0",
      "seconds_consumed_filtered": "30",
      "user_id": "791573bb-8165-4958-b872-2be0ec0a79ab",
      "hint_lck": "2",
      "start_epoch_utc": "1517886923",
      "meta_data": [
        {
          "activity": "5",
          "host": "e8.whatsapp.net",
          "port": "443",
          "type": "HTTPS",
          "out": "382",
          "timestamp": "1517886923639",
          "in": "471"
        }
      ],
      "uid": "10",
      "seq_id": "1517886923639",
      "process_bucket_id": "f372847a-cafd-4598-b163-597512b2f7ea",
      "device_id": "5C858A56-D228-4267-98F3-EF3E50223C41"
    }
  ]
}
```
810

```
"process_bucket": [
  {
    "device_id": "5C858A56-D228-4267-98F3-EF3E50223C41",
    "uid": "10",
    "user_id": "791573bb-8165-4958-b872-2be0ec0a79ab",
    "process_bucket_id": "f372847a-cafd-4598-b163-597512b2f7ea",
    "app_id": "1463889",
    "start_epoch_utc": "1517885267",
    "last_start_epoch_utc": "1517886923",
    "seconds_consumed": "240",
    "hint_lck": "2",
    "package_name": "OPERA_BACKGROUND_LOCK_GROUP",
    "app_type": "BackgroundLock_Type",
    "connection_type": "BackgroundLock_Type"
  }
]
```
820

```
{
  "start_epoch_utc": "1517887070",
  "last_start_epoch_utc": "1517887070",
  "consumption": [
  {
    "seconds_consumed": "30",
    "user_id": "791573bb-8165-4958-b872-2be0ec0a79ab",
    "hint_lck": "1",
    "start_epoch_utc": "1517887070",
    "meta_data": [
    {
      "activity": "67",
      "host": "usjc-edge.icloud-content.com",
      "port": "443",
      "type": "HTTPS",
      "out": "44466",
      "timestamp": "1517887077086",
      "in": "20771"
    },
    {
      "activity": "216",
      "host": "slack.com",
      "port": "443",
      "type": "HTTPS",
      "out": "19949",
      "timestamp": "1517887070277",
      "in": "88527"
    },
```

─ 830

```
{
  "uid": "1105",
  "seq_id": "1517887081949",
  "process_bucket_id": "fc5196ad-f89d-4917-af7c-ab7fe3205681",
  "device_id": "5C858A56-D228-4267-98F3-EF3E50223C41"
  }, "process_bucket": [
  {
    "device_id": "5C858A56-D228-4267-98F3-EF3E50223C41",
    "uid": "1105",
    "user_id": "791573bb-8165-4958-b872-2be0ec0a79ab",
    "process_bucket_id": "fc5196ad-f89d-4917-af7c-ab7fe3205681",
    "app_id": "4826",
    "start_epoch_utc": "1517887070",
    "last_start_epoch_utc": "1517887070",
    "seconds_consumed": "30",
    "hint_lck": "1",
    "package_name": "com.tinyspeck.chatlyio",
    "app_type": "AppName_Type",
    "connection_type": "Host_Type"
  }
  ]
}
```

```
// processing of input data with hint_lck != 2.
For each consumptionItem in consumptionObjs {
If hint_lck != 2 { //regular algorithm flow
    process host and user_agent:
    Finding Substrings
    Checking if blacklist or specific category
    ConnectionAnalysis()
    usedPid = unique id associated with app
    Package = application package identified
    process:
    FindConnectionMatch() // mapping entry to app
    AdjustTime() // adjusting any time between input
    connections/apps
    store/preserve context
}
else If hint_lck == 2 {
    Skip processing host and user_agent
    ConnectionAnalysis()
    usedPid = sBackgroundScreenLockPidId
    Package = BACKGROUND_LOCK_GROUP
    Skip everything else
}
}
```

Figure 10

APP USAGE DETECTION BASED ON SCREEN LOCK STATE

CROSS REFERENCE TO RELATED APPLICATIONS

This application claims priority to Provisional Application No. 62/627,011, filed on Feb. 6, 2018, the disclosure of which is incorporated by reference herein in its entirety.

TECHNICAL FIELD

This invention relates to the software application usage detection on mobile phones, specifically on whether the screen is locked.

BACKGROUND

Usage of networked computing devices involves running both foreground and background applications (also referred to as application software, apps or app). In operating systems that support multitasking, applications can make network requests periodically or at a particular time even though they are not actively launched by a user (i.e., not in the foreground). Typically, a foreground app is associated with user interaction with the computing device, while a background app may be associated with, for example, an application such as WhatsApp® making a network fetch to prepopulate its content.

An important aspect of determining application usage on a computing device based on network traffic is distinguishing between apps in the foreground and apps in the background. One way of distinguishing between a foreground app and a background app is based on the status of the screen lock associated with the computing device. Any network access requested when the screen of the computing device is locked is unlikely to be associated with user interaction and is most likely generated by a background app.

BRIEF DESCRIPTION OF THE DRAWINGS

Embodiments of the disclosure are illustrated by way of example and not limitation in the figures of the accompanying drawings in which like references indicate similar elements.

FIG. 4 is an exemplary algorithmic implementation for an operating system to detect the current screen lock state according to one embodiment.

FIGS. 5A and 5B show exemplary outputs of the network traffic monitor.

FIGS. 8A and 8B show examples of output generated by the app detector.

FIG. 10 is an exemplary algorithmic implementation of the app detector according to one embodiment.

DETAILED DESCRIPTION

Figure 1A:
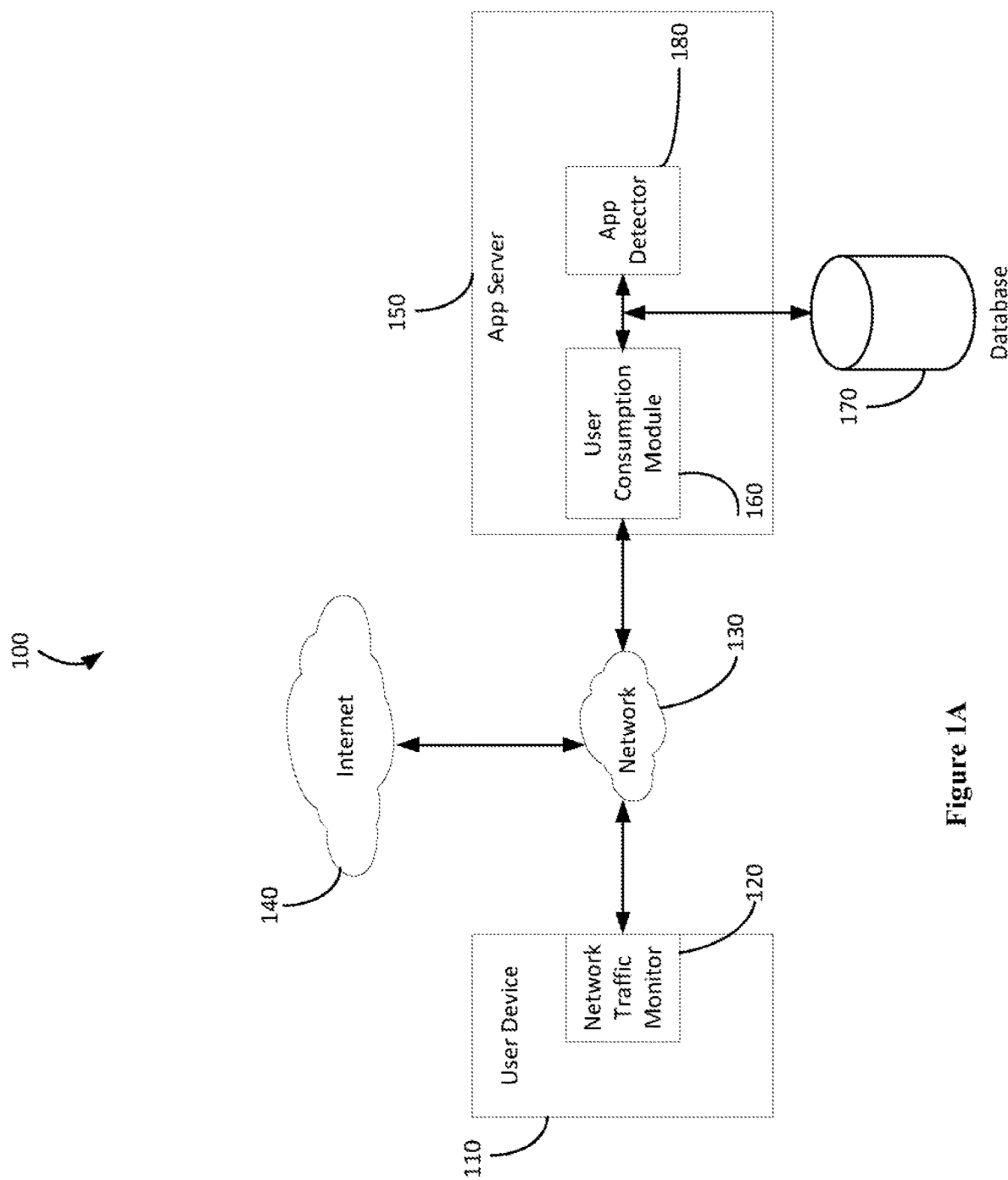
FIGS. 1A and 1B show exemplary block diagrams of a system for detecting app usage based on screen lock state according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The systems and methods for software application usage detection on a mobile device are disclosed. The software application usage detection is done by monitoring the network usage of the application. The software application usage information is further refined by monitoring the screen lock state of the mobile device. The screen lock information is used to refine the background and foreground usage of the software application.

In one aspect of the disclosure, screen lock information of the computing device is computed. Network traffic usage data for one or more processes running on the computing device is captured. The network traffic usage data for the one or more processes is characterized. The characterized network traffic usage data and the computed screen lock information are stored as network consumption data for the one or more processes.

In another aspect of the disclosure, the network consumption data is received. Whether a screen of the computing device is locked is determined based on the network consumption data. Regular application processing is run in response to determining that the screen is unlocked or a screen lock status of the computing device is unknown.

In one embodiment, in response to determining that the screen is locked, the regular application processing is run and a background flag indicative of background usage is set. In another embodiment, in response to determining that the screen is locked, the regular application processing is skipped and application processing associated with BACKGROUND_LOCK_GROUP is performed.

In one embodiment, in response to determining that the screen is unlocked or the screen lock status of the computing device is unknown, application detector data for the regular application processing is generated and stored. Otherwise in response to determining that the screen is locked, application detector data for the application processing associated with the BACKGROUND_LOCK_GROUP is generated and stored.

In one embodiment, the application detector data includes one or more process buckets associated with the one or more processes, each process bucket having a start time and an end time, wherein the start time is when beginning of an app usage is detected and the end time is when there is idle activity.

In one embodiment, to determine whether a screen of the computing device is locked, the screen lock status of the computing device is retrieved from the network consumption data, and whether the screen of the computing device is locked is determined based on the screen lock status.

In one embodiment, to compute the screen lock information of the computing device, a hint_lck flag at the time of network traffic activity of a network coupled to the computing device is computed.

In one embodiment, to run the regular application processing, the network consumption data is aggregated over time to derive aggregated information including a list of active applications being used on the computing device and usage data for each application, and the usage data is updated based on analyzed properties of the network consumption data.

Figure 1B:
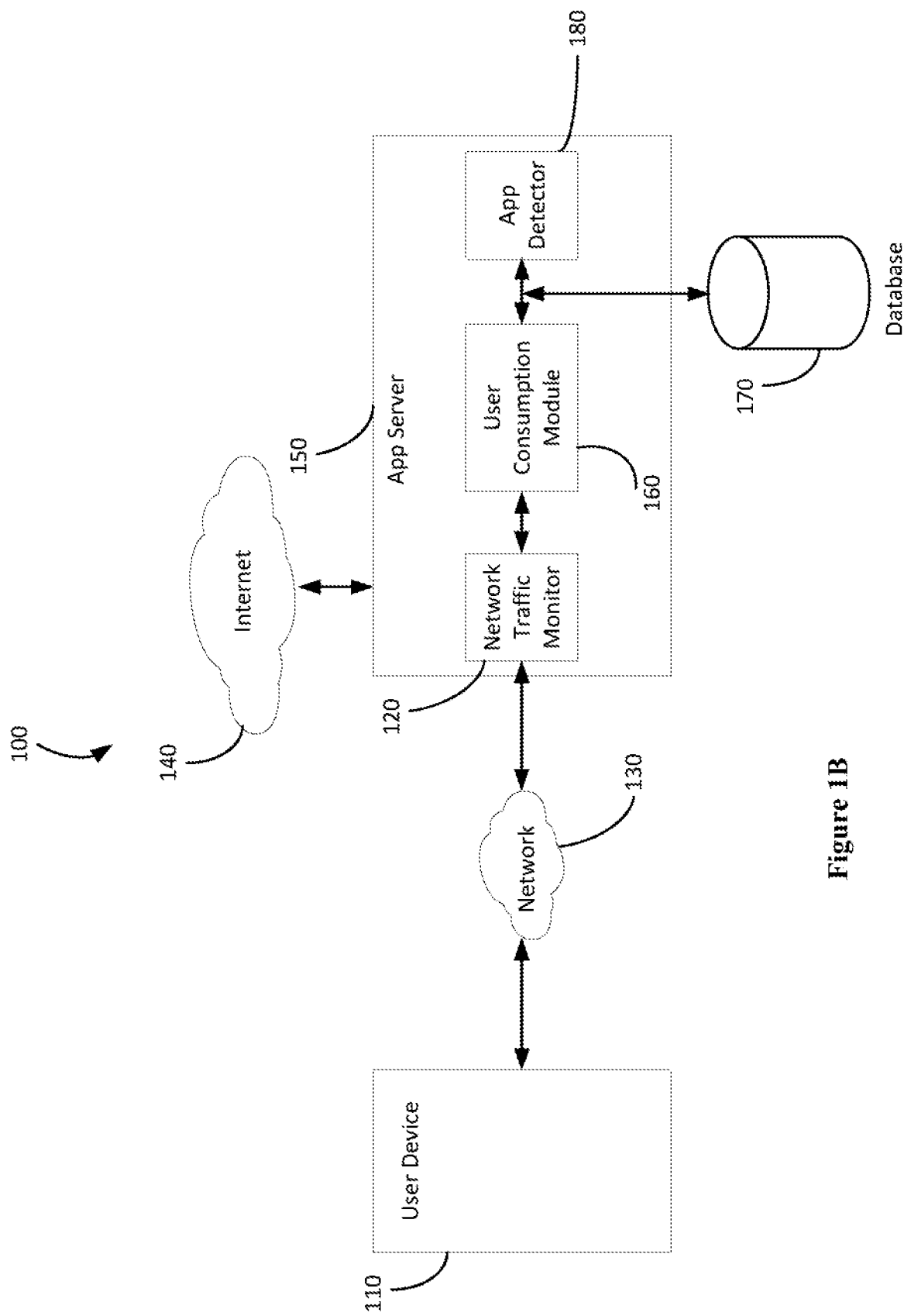

FIGS. 1A and 1B show exemplary block diagrams of a system for detecting app usage based on screen lock state. Referring to FIG. 1A, system 100 includes user device 110 interfacing with network 130. In one embodiment, user devices 110 may be a mobile device (e.g., smartphone, tablet), a laptop computer, a desktop computer, a wearable device (e.g., smartwatch), a vehicle (e.g., autonomous vehicle), or the like.

Figure 2:
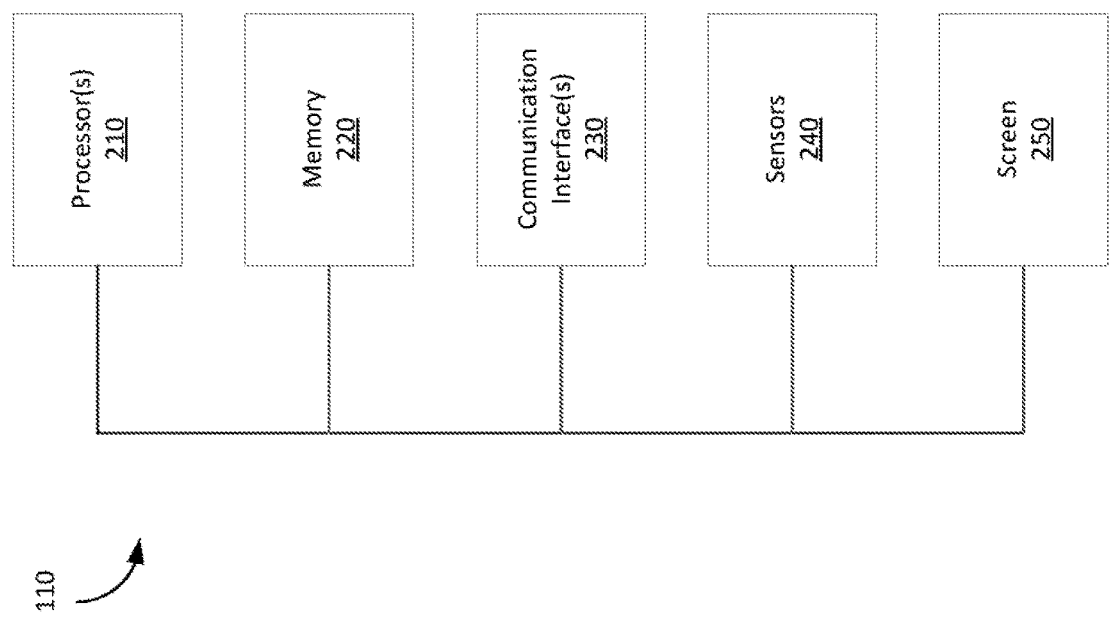
FIG. 2 shows an exemplary block diagram of a user device according to one embodiment.

Referring to FIG. 2, which shows an exemplary block diagram of user device 110 in system 100 of FIGS. 1A and 1B, user device 110 may include one or more processors 210, memory 220, sensors 240 (e.g., global positioning system (GPS), gyroscope, accelerometer, etc.), communication interfaces 230, such as 3G, 4G, 5G, long term evolution (LTE) modem, Wi-Fi, Ethernet, etc., and screen 250 (display, touch screen, video monitor etc.). The user device 110 may be a computing device capable of running an operating system, such as iOS®, Android®, Windows®, Mac OS, Chrome OS, and so on.

Referring back to FIG. 1A, software applications running on user device 110 may access Internet 140 via network 130 using communication interfaces 330. Examples of Internet 140 access include playing games, accessing social media networks, playing music or videos, updating of an app, prefetching data to populate apps like email/WhatsApp etc. In one embodiment, system 100 includes network traffic monitor 120 that is configured to monitor, store and upload network traffic usage data to app server 150 over network 130. The network traffic usage data includes any application network requests (e.g., any Internet traffic or access by user device 110) to servers (not explicitly shown) on Internet 140 and any traffic or access from servers on Internet 140 to the application software running on user device 110. Network traffic monitor 120 can run on the user device 110 or server 150. As shown in FIG. 1A, network traffic monitor 120 runs on the user device 110.

Referring to FIG. 1B, network traffic monitor 120 runs on app server 150. In FIGS. 1A and 1B, Internet traffic of software applications on user device 110 are routed first to app server 150 via network 130. In another embodiment, network traffic monitor 120 may be anywhere on the network 130, e.g., on a network router (not explicitly shown).

Network traffic usage data is provided to user consumption module 160. User consumption module 160 characterizes the network traffic usage data and saves this data to database 170 as network consumption data with the help of app detector 180. User consumption module 160 provides feedback data or commands associated with the apps running on user device 110. The feedback data or commands may be transmitted to user device 110. App detector 180 analyzes the network traffic usage data and identifies applications and performs time allotments of the applications. App detector 180 receives network consumption data for processes/apps executing on user device 110, for example from user consumption module 160 or database 170, and identifies applications for the processes by analyzing the network consumption data. The application detector 180 derives usage information for applications executing on the user device 110 by aggregating network consumption data associated with applications over time. The derived information may include a list of active applications that are being used or executed on user device 110, usage data for each application, among other things. The application detector 180 may further update the usage data, such as by modifying usage time parameters (e.g., usage time, usage time line, etc.) based on analyzing properties of the network consumption data. The application detector 180 generates and provides reports of the usage data for applications on user device 110, or another device (not shown).

Figure 3:
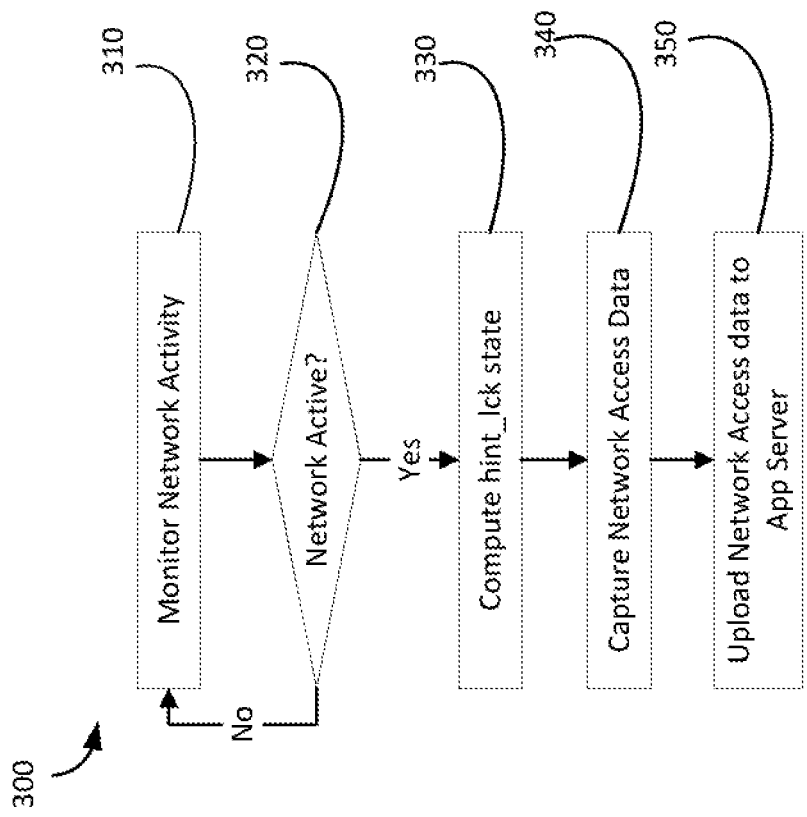
FIG. 3 is an exemplary flowchart of a method performed by a network traffic monitor according to one embodiment.

FIG. 3 is an exemplary flowchart of a method performed by a network traffic monitor according to one embodiment. The embodiments of the disclosure may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. In some embodiments, the network traffic monitor may be network traffic monitor 120 of FIGS. 1A and 1B. Referring to FIG. 3, method 300 starts in block 310 where network traffic of network 130 is monitored and checked to see if network 130 is active (block 320). In the block 330, screen lock information (e.g., screen lock state) is computed and this screen lock information is sent via "hint_lck" flag. hint_lck is computed at the time of network traffic activity of network 130.

Every operating system (OS) supports direct or indirect ways of finding if the screen is locked or unlocked. In some embodiments, screen lock information may capture situations where the screen is off even though explicit lock of password, passcode, or biometric, for example, is not shown. For example, the screen may be locked after expiration of a timer (which can be set by a user of user device 110 or set as a default setting on user device 110) to turn off the screen. In some operating systems (e.g., iOS®), monitoring can be done using virtual private network (VPN), and using OS-provided mechanisms. These methods are available via public documentation of the respective operating systems. For example, in Android OS a screen lock state can be fetched using one of the methods:

Display.getState( ), PowerManager.isInteractive( ) or system broadcasts Intent.ACTION_SCREEN_OFF, Intent.ACTION_SCREEN_ON, Intent.ACTION_USER_PRESENT.

In Apple iOS®, as an example, this information can be derived by using an indirect approach of detecting when a protect file is available (screen unlocked) vs. unavailable (screen locked).

Referring to FIG. 4, which shows an exemplary algorithmic implementation for an operating system to detect the current screen lock state according to one embodiment. For example, in iOS®, the values of hint_lck are:
   0: screen lock information unknown
   1: screen lock is not locked
   2: screen is locked The hint_lck state may be computed using processor(s) 210, memory 220, communication interfaces 230, and/or screen 250 (as previously described).

Referring back to FIG. 3, in block 340 network access data (or network traffic usage data) of network 130 is captured and sent to app server 150 via network 130. In some embodiments, screen lock information is sent or uploaded to the app server 150, either along with the network traffic usage information (in-band) or with precise timestamp (out-of-band) as network consumption data to refine the app usage detection algorithms (block 350).

FIGS. 5A and 5B show exemplary outputs of the network traffic monitor. FIG. 5A shows exemplary output with the hint_lck corresponds to a value 1, whereas FIG. 5B shows an exemplary output with the value of hint_lck is 2. The output data, for example, includes timestamps, type of access (e.g., http, https, ftp, etc.), host on Internet 140, input and output ports, user identifier (ID), process ID, time of network access, etc. for each access. The output of the network traffic monitor is referred to as metadata, network data or network usage metadata.

Figure 6:
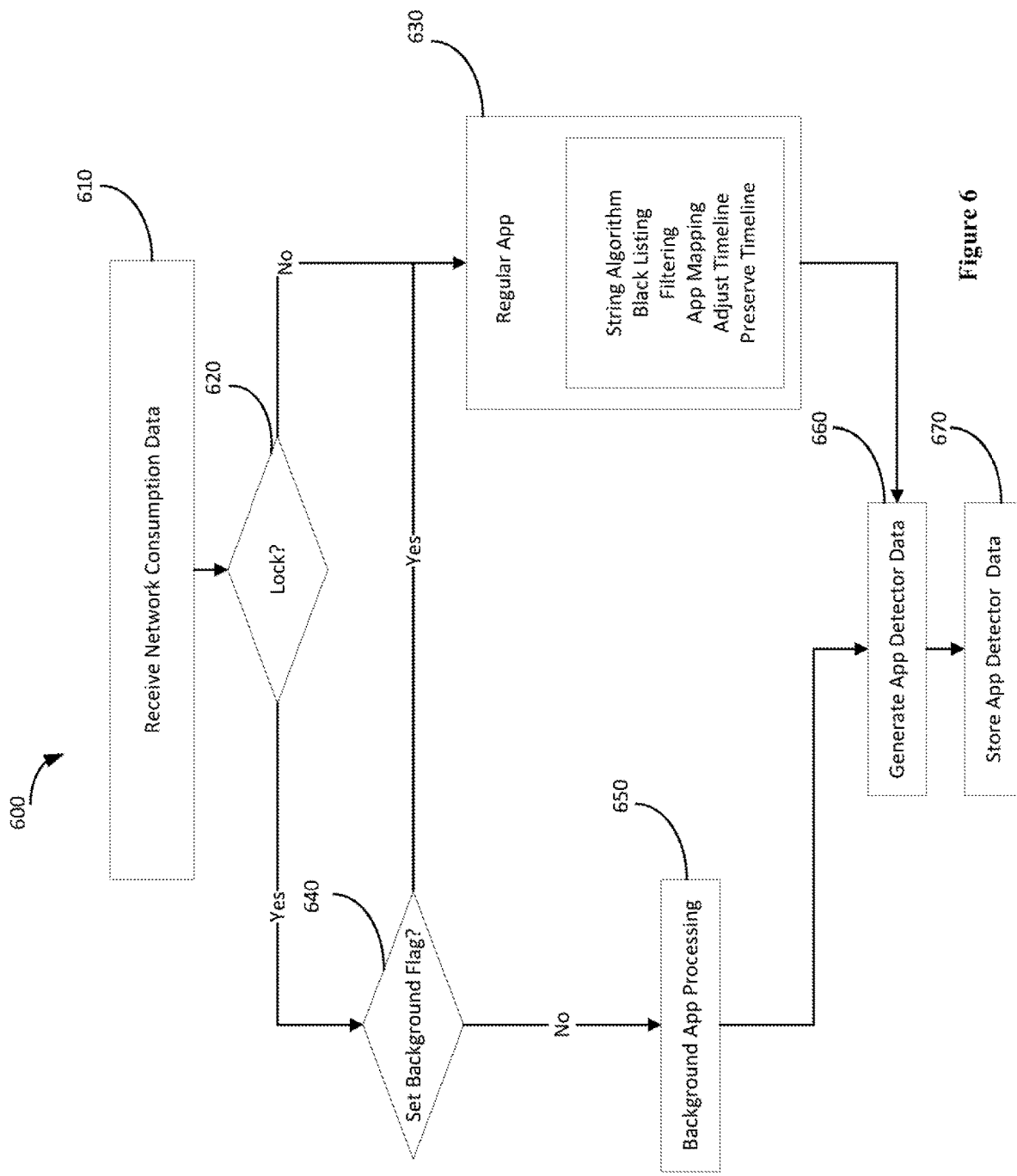
FIG. 6 is an exemplary flowchart of a method performed by an app detector (or application detector) according to one embodiment.

FIG. 6 is an exemplary flowchart of a method performed by an app detector according to one embodiment. In some embodiments, the app detector may be app detector 180 of FIGS. 1A and 1B. At block 610, network traffic usage data is received as input network consumption data and a screen lock status of user device 110 may be retrieved from the network consumption data. If the screen of user device 110 is unlocked or if lock status cannot be determined (i.e., unknown), the app detector 180 runs regular processing algorithms such as string algorithms, blacklisting, filtering, app mapping, adjusting timelines, preserving a state of the system, and so on. The app detector 180 then generates an output having a derived app and an associated duration which may be measured in seconds.

If the screen of the user device 110 is locked the app detector 180 may either continue regular processing (string algorithms, blacklisting, filtering, app mapping, adjusting timelines, preserving a state of the system, and so on) with a special flag/variable referred to as BACKGROUND FLAG or the regular processing algorithms are skipped, while the app detector 180 performs processing associated with the BACKGROUND_LOCK_GROUP.

Background Flag

With the screen of user device 110 locked, app detector 180 may continue with the regular processing but with a special flag/variable/indicator indicating this usage is background. The app detector 180 may generate an output having a derived app and associated duration of usage. The time allotted to apps with the background flag active can be ignored or discarded from the total time calculation by the app server 150 (e.g., user consumption module 160).

Background Lock Group

In app detector 180, BACKGROUND_LOCK_GROUP represents a pseudo app or app group and represents network/app usage when the screen of the user device 110 is locked (this is mostly deemed background usage).

When the device screen is locked, all the network traffic parameters are allocated to this specific derived app bucket/group even though different apps trigger the usage.

Seconds/duration/time is allotted to this derived app or group.

All the time allotted to this group can be ignored/discarded from total time calculation if so desired by the app server/usage consumption modules.

FIG. 10 shows an exemplary algorithmic implementation of an app detector according to one embodiment. In some embodiments, the app detector may be app detector 180 of FIGS. 1A and 1B with regular flow and BACKGROUND_LOCK_GROUP.

Referring back to FIG. 6, in block 620, it is determined if the screen of user device 110 is locked. In some embodiments, the lock status of the screen of user device 110 may capture situations where the screen is off even though explicit lock of password, passcode, or biometric, for example, is not shown. For example, the screen may be locked after expiration of a timer (which can be set by a user of user device 110 or set as a default setting on user device 110) to turn off the screen. Typically, the lock status of the screen of user device 110 is determined by hint_lck that is generated by network traffic monitor 120. However, there may be cases when hint_lck is not available. In that case, app detector 180 analyzes the network traffic of network 130 to determine if the screen of user device 110 is locked.

In one embodiment, app detector 180 looks at size of the data transfer and rate of data transfer to determine if the data transfer is happening with the screen of user device 110 is locked. The traffic caused by background noise is of small or insignificant footprint, e.g., an app may perform a quick application programming interface (API) request in the background. The data transfer rate and along with the transfer size are considered to determine if the data transfer is happening in the background. Different transfer size and transfer rate thresholds are used for different categories, such as games, app software development kits (SDKs), Analytics SDKs, Ads, etc.

In another embodiment, app detector 180 analyzes the traffic pattern to determine if the screen of the user device 110 is locked. Traffic generated by short/quick pulses of network traffic that are spaced out across some time window, for example: a location-based app might be periodically making a request once in every 5 minutes. A network usage mapped to an app triggers the start of a sliding window with an expiry after "n" seconds. If there are no more similar networks transfers before the sliding window expires, the network transfer is treated such that the screen was unlocked on the user device 110.

In yet another embodiment, app detector 180 uses the user history of network transfers, time-zone, time of transfer to determine if the screen of user device 110 is locked. For example, network requests made during night time may indicate that screen is locked based on the history.

In block 640, it is determined if the "BACKGROUND FLAG" should be set. If so, the method proceeds to block 630. Otherwise, the method proceeds to block 650.

In block 650, it is determined that the screen of user device 110 is locked. As described previously, BACKGROUND_LOCK_GROUP represents a pseudo app or app group and represents network/app usage in screen lock state.

In the block 630, regular app processing is performed and includes the following functions:

i. Application strings associated with the applications. The application strings may include an application name string for each application, a package name string for the packages of each application, and a category string for each application. The application strings may further include key word strings that application providers associate with the application, such as in the application's description.

ii. Consumption data strings from network 130 consumption data. These may include a host string and user-agent string.

iii. Match scores are determined by identifying matching strings between application strings and the consumption data strings along weighted search paths defined between application strings and consumption data strings.

iv. Once the string match has been performed, the matches are ordered by match scores. The application detector identifies an application from the application list for the process based on match scores and associates the network consumption data for the process with the application.

v. The system generates usage data for the application by aggregating network consumption data associated with the application over time.

The blacklist is a collection of strings that are not to be used for matching. The application detector generates an internal representation of a stored analysis data such that the analysis can be restored to its previous state quickly. This feature allows for an individual server to be stateless across analysis requests.

In block 660, app detector data is generated. Referring to FIG. 8A, data for BACKGROUND_LOCK_GROUP is generated. FIG. 8B shows the app detector data for regular app processing. The app detector data may include one or more process buckets (as described in more detail herein below).

Referring back to FIG. 6, app detector 180 in conjunction with user consumption 160 stores the data generated to the database 170 (block 670). The data in the database 170 is used further refine network usage and screen lock detection on a continuous basis.

Process Buckets

Process buckets are local derived snapshots of app usage over a certain period. They have information of the application identified, time that is allotted to this app, mapping logic used for identifying the app, internal ids that are representing the app and more. Each process bucket has a start and end time. Process bucket starts when app detector 180 detects beginning of an app usage and continues the life of process bucket as long as the traffic from this app continues. Sometimes, process bucket is ended when there is idle activity (e.g., no network traffic for 'n' minutes). In one embodiment, when app detector 180 sees screen lock information, i.e., hint_lck:2, all the existing process buckets are expired.

Figure 7:
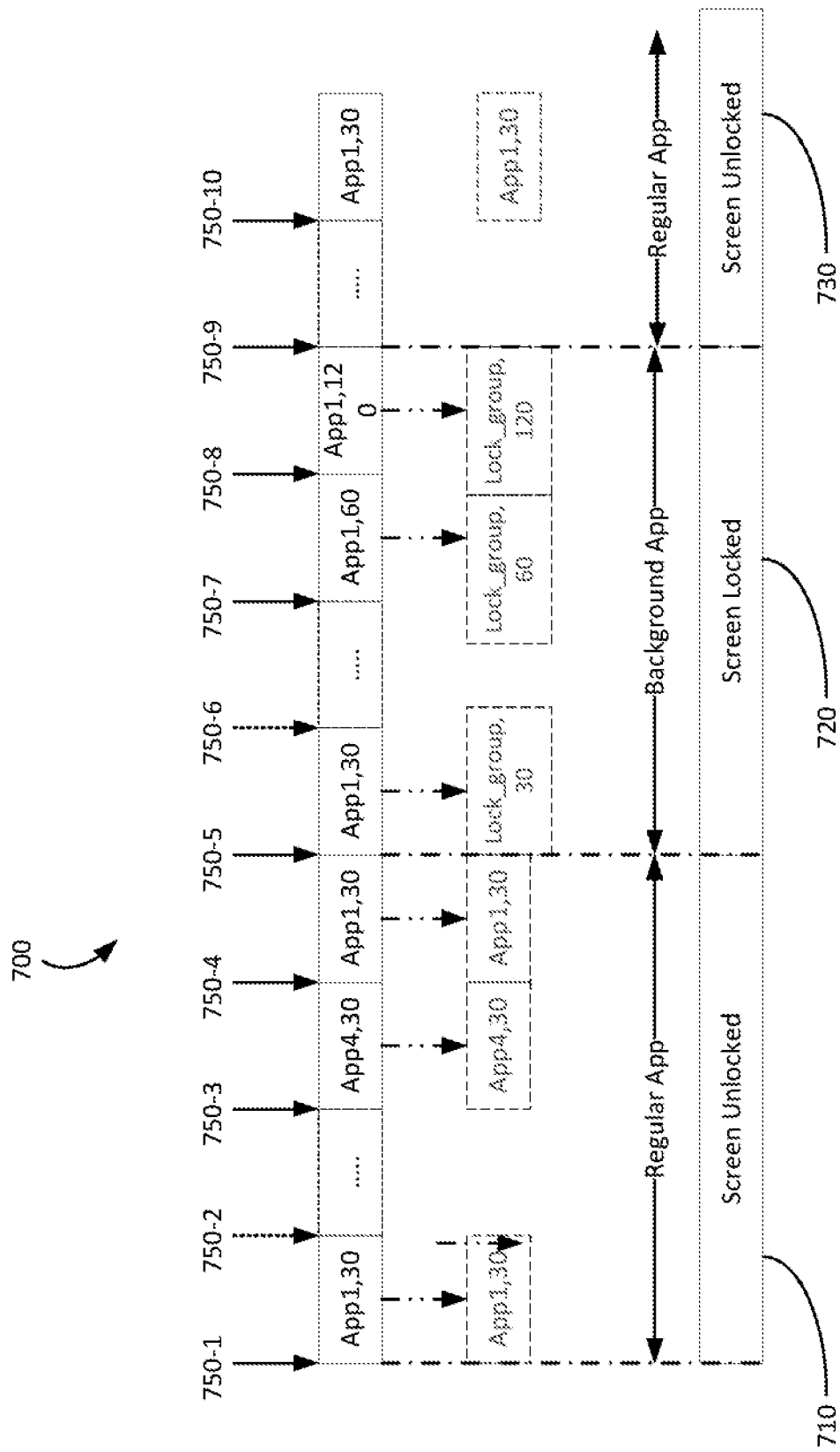
FIG. 7 is an exemplary timeline of network usage and app usage based on screen lock state according to one embodiment.

Referring to FIG. 7, which is an exemplary timeline of network usage and app usage based on screen lock state according to one embodiment. Each vertical arrow 750-1, 750-2 . . . 750-10 corresponds to a network pulse (or a group of network pulses) as generated by the user device 110 upon initiating network access, where the network access is for a specified duration for a specific application. FIG. 7 shows some of the apps used by a user on the user device 110 (e.g., App1, App4, and so on) are depicted. For example, users may use App1 initially for 30 seconds. This usage generates the first network pulse 750-1 shown in FIG. 7. After some time, the user might use App4 (network pulse 750-3) for 30 seconds, and then reverts to App1 (network pulse 750-4) for another 30 seconds. During this time, the hint_lck flag is either 1 or 0, corresponding to screen unlocked state 710 on the user mobile device. Each network access by an app in this state generates a network pulse, and this screen unlocked state 710 corresponds to a regular data flow state associated with the app detector 180.

Next, the user device 110 may transition into screen locked state 720, corresponding to hint_lck flag taking on a value of 2. Here, any network access pulses are interpreted as being generated by background apps, such as App1 (network pulse 750-5) that accesses the network for 30 seconds, 60 seconds (network pulse 750-7), and then 120 seconds (network pulse 750-8) at different times during the period that the screen of the user mobile device is locked. In one implementation, even though App1 is generating network traffic, app detector 180 tags all these pulses as BACKGROUND_LOCK_GROUP since hint_lck=2. After this period, the user unlocks the screen of the user mobile device, and the system returns to the regular data flow state 730.

Figure 9:
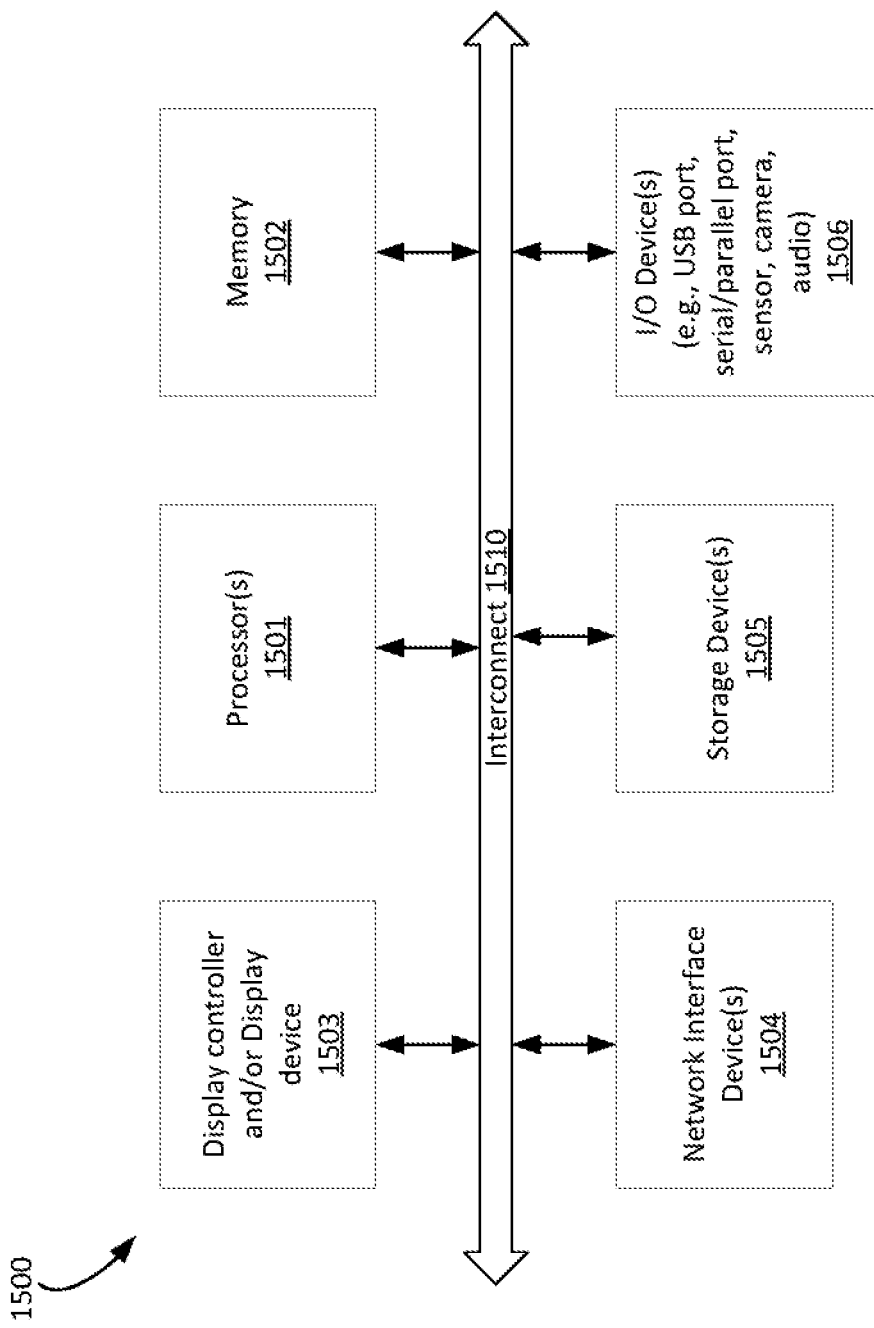
FIG. 9 is an exemplary block diagram of a data processing system according to one embodiment.

FIG. 9 shows an exemplary block diagram of a data processing system which may be used with one embodiment of the invention. For example, system 1500 may represent any of data processing systems described above performing any of the processes or methods described above, such as, for example, app server 150 of FIGS. 1A and 1B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes one or more processors 1501, memory 1502, and devices 1504-1506 coupled or connected to one another via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1503, which may include a display controller, a graphics processor, and/or a display device.

Processor 1501 may communicate with memory 1502, which in one embodiment can be implemented via multiple memory devices to provide for a given amount of system memory. Memory 1502 may include one or more volatile storage (or memory) devices such as random access memory (RAM), dynamic RAM (DRAM), synchronous DRAM (SDRAM), static RAM (SRAM), or other types of storage devices. Memory 1502 may store information including sequences of instructions that are executed by processor 1501, or any other device. For example, executable code and/or data of a variety of operating systems, device drivers, firmware (e.g., input output basic system or BIOS), and/or applications can be loaded in memory 1502 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1504-1506, including network interface device(s) 1504, storage device(s) 1505, and 10 device(s) 1506. Network interface device 1504 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Storage device(s) 1505 may include computer-accessible storage medium (also known as a machine-readable storage medium or a computer-readable medium) on which is stored one or more sets of instructions or software (e.g., module, unit, and/or logic) embodying any one or more of the methodologies or functions described herein. The processing module/unit/logic may represent any of the components described above, such as, for example, network traffic monitor 120, user consumption module 160, and app detector 180 (alone or in combination). The processing module/unit/logic may also reside, completely or at least partially, within memory 1502 and/or within processor 1501 during execution thereof by data processing system 1500, memory 1502 and processor 1501 also constituting machine-accessible storage media. The processing module/unit/logic may further be transmitted or received over a network via network interface device 1504.

The computer-readable storage medium may also be used to store the some software functionalities described above persistently. While the computer-readable storage medium in an exemplary embodiment may be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

The processing module/unit/logic, components and other features described herein can be implemented as discrete hardware components or integrated in the functionality of hardware components such as ASICS, FPGAs, DSPs or similar devices. In addition, the processing module/unit/logic can be implemented as firmware or functional circuitry within hardware devices. Further, the processing module/unit/logic can be implemented in any combination hardware devices and software components.

IO devices 1506 may include an audio device. An audio device may include a speaker and/or a microphone to facilitate voice-enabled functions, such as voice recognition, voice replication, digital recording, and/or telephony functions. IO devices 1506 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1506 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed in part by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for detecting software application usage on a computing device, the method comprising:
   computing screen lock information of the computing device;
   capturing network traffic usage data for one or more processes running on the computing device;

characterizing the network traffic usage data for the one or more processes;
storing the characterized network traffic usage data and the computed screen lock information as network consumption data for the one or more processes;
receiving the network consumption data;
determining whether a screen of the computing device is locked based on the network consumption data;
in response to determining that the screen is unlocked or a screen lock status of the computing device is unknown,
running regular application processing, and
generating and storing application detector data for the regular application processing;
otherwise in response to determining that the screen is locked,
skipping the regular application processing and performing application processing associated with BACKGROUND_LOCK_GROUP, and
generating and storing application detector data for the application processing associated with the BACKGROUND_LOCK_GROUP.

2. The method of claim 1, further comprising:
otherwise in response to determining that the screen is locked, running the regular application processing and setting a background flag indicative of background usage.

3. The method of claim 1, wherein the application detector data includes one or more process buckets associated with the one or more processes, each process bucket having a start time and an end time, wherein the start time is when beginning of an app usage is detected and the end time is when there is idle activity.

4. The method of claim 1, wherein determining whether the screen of the computing device is locked comprises:
retrieving the screen lock status of the computing device from the network consumption data, and
determining whether the screen of the computing device is locked based on the screen lock status.

5. The method of claim 1, wherein computing the screen lock information of the computing device comprises computing a hint_lck flag at the time of network traffic activity of a network coupled to the computing device.

6. The method of claim 1, wherein running the regular application processing comprises:
aggregating the network consumption data over time to derive aggregated information including a list of active applications being used on the computing device and usage data for each application, and
updating the usage data based on analyzed properties of the network consumption data.

7. A non-transitory machine-readable medium having instructions stored therein, which when executed by a processor, cause the processor to perform operations, the operations comprising:
computing screen lock information of the computing device;
capturing network traffic usage data for one or more processes running on the computing device;
characterizing the network traffic usage data for the one or more processes;
storing the characterized network traffic usage data and the computed screen lock information as network consumption data for the one or more processes;
receiving the network consumption data;
determining whether a screen of the computing device is locked based on the network consumption data;
in response to determining that the screen is unlocked or a screen lock status of the computing device is unknown,
running regular application processing, and
generating and storing application detector data for the regular application processing;
otherwise in response to determining that the screen is locked,
skipping the regular application processing and performing application processing associated with BACKGROUND_LOCK_GROUP, and
generating and storing application detector data for the application processing associated with the BACKGROUND_LOCK_GROUP.

8. The non-transitory machine-readable medium of claim 7, wherein the operations further comprise:
otherwise in response to determining that the screen is locked, running the regular application processing and setting a background flag indicative of background usage.

9. The non-transitory machine-readable medium of claim 7, wherein the application detector data includes one or more process buckets associated with the one or more processes, each process bucket having a start time and an end time, wherein the start time is when beginning of an app usage is detected and the end time is when there is idle activity.

10. The non-transitory machine-readable medium of claim 7, wherein determining whether the screen of the computing device is locked comprises:
retrieving the screen lock status of the computing device from the network consumption data, and
determining whether the screen of the computing device is locked based on the screen lock status.

11. The non-transitory machine-readable medium of claim 7, wherein computing the screen lock information of the computing device comprises computing a hint_lck flag at the time of network traffic activity of a network coupled to the computing device.

12. The non-transitory machine-readable medium of claim 7, wherein running the regular application processing comprises:
aggregating the network consumption data over time to derive aggregated information including a list of active applications being used on the computing device and usage data for each application, and
updating the usage data based on analyzed properties of the network consumption data.

13. A data processing system, comprising:
a processor; and
a memory coupled to the processor to store instructions, which when executed by the processor, cause the processor to perform operations, the operations including:
computing screen lock information of the computing device;
capturing network traffic usage data for one or more processes running on the computing device;
characterizing the network traffic usage data for the one or more processes;
storing the characterized network traffic usage data and the computed screen lock information as network consumption data for the one or more processes;
receiving the network consumption data;
determining whether a screen of the computing device is locked based on the network consumption data;

in response to determining that the screen is unlocked or a screen lock status of the computing device is unknown,
running regular application processing, and
generating and storing application detector data for the regular application processing;
otherwise in response to determining that the screen is locked,
skipping the regular application processing and performing application processing associated with BACKGROUND_LOCK_GROUP, and
generating and storing application detector data for the application processing associated with the BACKGROUND_LOCK_GROUP.

14. The data processing system of claim 13, wherein the operations further include: otherwise in response to determining that the screen is locked, running the regular application processing and setting a background flag indicative of background usage.

15. The data processing system of claim 13, wherein the application detector data includes one or more process buckets associated with the one or more processes, each process bucket having a start time and an end time, wherein the start time is when beginning of an app usage is detected and the end time is when there is idle activity.

16. The data processing system of claim 13, wherein determining whether the screen of the computing device is locked comprises:
retrieving the screen lock status of the computing device from the network consumption data, and
determining whether the screen of the computing device is locked based on the screen lock status.

17. The data processing system of claim 13, wherein computing the screen lock information of the computing device comprises computing a hint_lck flag at the time of network traffic activity of a network coupled to the computing device.

18. The data processing system of claim 13, wherein running the regular application processing comprises:
aggregating the network consumption data over time to derive aggregated information including a list of active applications being used on the computing device and usage data for each application, and
updating the usage data based on analyzed properties of the network consumption data.

* * * * *